(12) United States Patent
Recouvreur et al.

(10) Patent No.: US 8,037,737 B2
(45) Date of Patent: Oct. 18, 2011

(54) ESTIMATION OF EXHAUST GAS TEMPERATURE AT THE OUTPUT OF THE EGR CIRCUIT OF A COMBUSTION ENGINE

(75) Inventors: Philippe Recouvreur, Montrouge (FR); Olivier Tigrine, Boutigny sur Essonne (FR)

(73) Assignee: RENAULT s.a.s., Boulogne Billancourt (FR)

( * ) Notice: Subject to any disclaimer, the term of this patent is extended or adjusted under 35 U.S.C. 154(b) by 165 days.

(21) Appl. No.: 12/514,821

(22) PCT Filed: Oct. 31, 2007

(86) PCT No.: PCT/FR2007/052286
§ 371 (c)(1),
(2), (4) Date: Jul. 31, 2009

(87) PCT Pub. No.: WO2008/059153
PCT Pub. Date: May 22, 2008

(65) Prior Publication Data
US 2010/0043525 A1    Feb. 25, 2010

(30) Foreign Application Priority Data
Nov. 17, 2006 (FR) ..................... 06 10065

(51) Int. Cl.
*G01M 15/04* (2006.01)
(52) U.S. Cl. .................... 73/23.31; 73/114.71
(58) Field of Classification Search ............ 73/23.31, 73/114.69, 114.71, 114.74
See application file for complete search history.

(56) References Cited

U.S. PATENT DOCUMENTS

| | | | |
|---|---|---|---|
| 5,303,168 A * | 4/1994 | Cullen et al. | 700/299 |
| 5,576,487 A * | 11/1996 | Gimson | 73/204.11 |
| 5,732,688 A | 3/1998 | Charlton et al. | |
| 5,931,140 A | 8/1999 | Maloney | |
| 5,974,870 A * | 11/1999 | Treinies et al. | 73/114.33 |
| 6,085,732 A * | 7/2000 | Wang et al. | 123/568.12 |
| 6,622,548 B1 * | 9/2003 | Hernandez | 73/114.74 |
| 6,651,492 B2 * | 11/2003 | Kolmanovsky et al. | 73/114.42 |
| 6,848,434 B2 * | 2/2005 | Li et al. | 123/568.12 |
| 6,993,909 B2 * | 2/2006 | Matsunaga et al. | 60/605.2 |
| 7,117,078 B1 * | 10/2006 | Gangopadhyay | 701/103 |
| 7,174,713 B2 * | 2/2007 | Nitzke et al. | 60/605.2 |
| 7,881,858 B2 * | 2/2011 | Kress et al. | 701/107 |
| 2003/0226398 A1* | 12/2003 | Hernandez et al. | 73/118.1 |
| 2004/0084030 A1 | 5/2004 | Matsunaga et al. | |
| 2007/0012040 A1* | 1/2007 | Nitzke et al. | 60/605.2 |

FOREIGN PATENT DOCUMENTS

| | | |
|---|---|---|
| DE | 101 58 261 | 6/2003 |
| EP | 0 879 950 | 11/1998 |
| EP | 1 416 139 | 5/2004 |

* cited by examiner

*Primary Examiner* — Freddie Kirkland, III
(74) *Attorney, Agent, or Firm* — Oblon, Spivak, McClelland, Maier & Neustadt, L.L.P.

(57) ABSTRACT

A method for estimating the temperature of exhaust gases of a combustion engine at an output of an EGR circuit fitted on the engine, based on a model that takes into account thermal energy losses of the exhaust gases at an EGR cooler or EGR circuit, the model also taking into account thermal exchange between the exhaust gases and the walls of a duct conveying the exhaust gases to the EGR cooler. A vehicle can implement such an estimation.

6 Claims, 2 Drawing Sheets

ESTIMATION OF EXHAUST GAS TEMPERATURE AT THE OUTPUT OF THE EGR CIRCUIT OF A COMBUSTION ENGINE

BACKGROUND

The invention relates to an estimation of the exhaust gas temperature in an internal combustion engine at the outlet of an EGR circuit with which the engine is equipped.

In strategies developed in engine software as regards air management, it is necessary to know the exhaust gas temperature at the outlet of the EGR circuit.

The measurement of the exhaust gas temperature at the outlet of the EGR circuit may be found using a thermocouple measurement.

This solution is precise but expensive (especially due to the cost of the thermocouple and the cost of the acquisition chain). It also requires the provision in the engine compartment of the volume needed to integrate it.

This is why it is becoming increasingly preferable to replace the thermocouple with an estimate of the exhaust gas temperature at the outlet of the EGR circuit.

For this purpose, numerical models based on physics equations are used (e.g. conservation of mass equation and conservation of energy equation).

The major drawback is the lack of precision and reliability of the model.

Specifically, to achieve a high level of precision, it is necessary to solve complex equations involving complex calculation means.

Moreover, these calculation means must be simple enough to be integrated into the computer of the motor vehicle.

An "estimation precision/calculation simplicity" compromise must therefore be found.

Such an approach is conventionally used in calculation means by making assumptions about the physical phenomena governing the exhaust gas heat exchange in EGR circuits and by noting that the exhaust gas temperature drop in an EGR circuit is dependent on the thermal performance of the EGR cooler.

However, trials on vehicles, based on the actual thermal performance of the EGR cooler, have shown that there could be deviations of up to 200 to 300° C. between the estimated and measured gas temperature at the outlet of the EGR circuit.

By numerically adjusting the thermal performance of the cooler so as to attempt to correlate the measurements with the model, the average deviations will thus be reduced to around fifty degrees Celsius.

However, this inaccuracy remains considerable, and therefore unsatisfactory.

BRIEF SUMMARY

A main objective of the invention is to improve the precision of the estimated temperature at the outlet of the EGR circuit.

Another objective of the invention is to reduce the complexity of the calculations needed to calculate this temperature, while still maintaining an acceptable possible margin of error.

To achieve these objectives, the invention provides, according to a first aspect, a method of estimating the exhaust gas temperature $T_3$ in an internal combustion engine at the outlet of an EGR circuit with which the engine is equipped, based on a model that takes into account the thermal energy loss of the exhaust gas in the EGR cooler of the EGR circuit, characterized in that the model furthermore takes into account the heat exchange between the exhaust gas and the walls of a duct conveying the exhaust gas to the EGR cooler.

Other optional features of this method of estimation are:
said model takes into account the following types of heat exchange:
the internal heat exchange between the gas and the wall of said duct;
the external heat exchange between the wall of said tube and the environment outside the engine compartment, such as convective heat exchange due to a flow of air and radiative exchange of components external to the duct; and
the gas cooling through the EGR cooler;
said model is based on simplified equations for the conservation of thermal energy of the gas taking into account the various types of heat exchange over the entire length of the EGR circuit, making it possible:
(a) to determine the heat exchange between the exhaust gas and the walls of a duct conveying the exhaust gas to the EGR cooler of the EGR circuit;
(b) to determine the heat exchange between the exhaust gas and the inlet of the EGR cooler, taking into account the determination in step (a); and
(c) to determine the heat exchange of the exhaust gas in the EGR cooler;
said equations form a system of three equations with three unknowns $T_w$, $T_2$ and $T_3$, knowing that $T_w$ is the estimated temperature of the walls of said duct and that $T_2$ is the estimated temperature of the exhaust gas at the inlet of the cooler, the three equations corresponding to the three determinations (a), (b) and (c);
the temperature $T_3$ is mainly estimated from knowing the exhaust gas temperature at the inlet of the EGR circuit, the temperature of the engine coolant leaving the engine, the specific heat of the EGR gas at constant pressure, the mass flow rate of the EGR gas, the specific heat of said duct and the geometric and mass characteristics of the duct;
said model amounts to a system of independent linear first-order differential equations;
these equations are found by making the following approximations:
the external convective heat exchange linked to air flowing around the duct is of the same order of magnitude as the radiative heat exchange by components external to the duct;
the convection temperature is approximately equal to the water temperature; and
the changes in $T_2$ over time are instantaneous compared with the changes in $T_w$ over time.

According to a second aspect, the invention provides a vehicle equipped with an electronic temperature estimator comprising computing means and means for storing predetermined and/or measured data so as to implement said method of estimation.

BRIEF DESCRIPTION OF THE DRAWINGS

Other features, objects and advantages of the invention will become more clearly understood on reading the detailed description of nonlimiting embodiments of the invention, illustrated by the following figures.

DETAILED DESCRIPTION

The invention described below involves the following two embodiments, enabling the exhaust gas temperature at the outlet of the EGR cooler to be estimated:

development of equations closely modeling physical phenomena, the equations being reduced to their strictest necessary for them to be able to be integrated into an engine software package; an appreciable improvement in the precision of the estimator of the exhaust gas temperature in the EGR circuit is obtained, given that the model used is closer to reality; and drastic simplification of the equations considered in the first embodiment—the objective is to minimize the computing time and the software size.

The two proposed embodiments are readily applicable to all internal combustion engines equipped with EGR circuits (diesel engine, gasoline engine, etc.).

Figure 1:
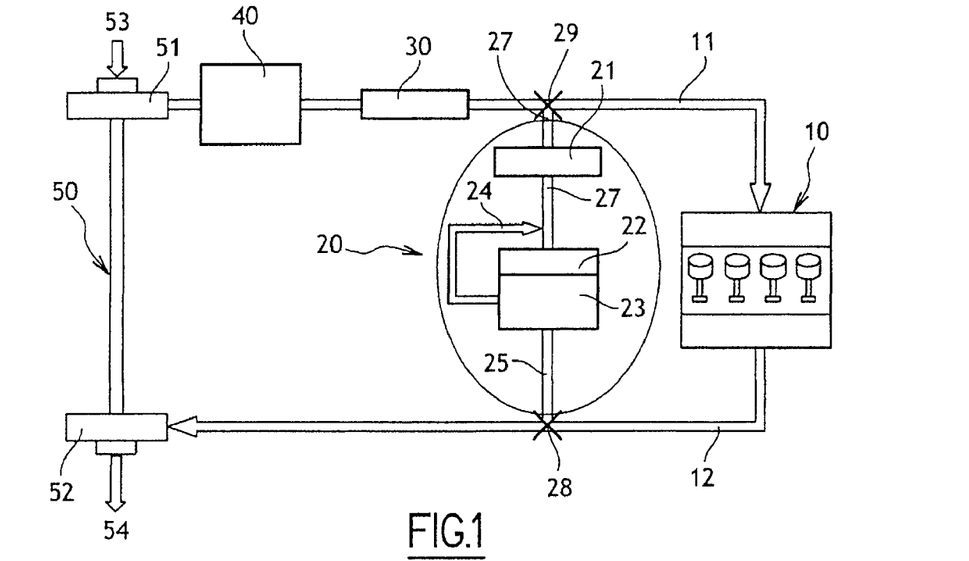
FIG. 1 shows schematically the various elements of a compartment of an internal combustion engine equipped with an EGR circuit.

FIG. 1 shows an example of an internal combustion engine compartment.

This engine compartment comprises an internal combustion engine 10 supplied with air via an intake duct 11 and discharging its exhaust gas via a discharge duct 12. This engine compartment is also provided with a turbocharger 50, comprising a compressor 51 located on the intake duct 11, in order to compress the fluid fuel coming from the line 53. Optionally, cooling means 40 and a flap 30 are provided between the compressor 51 and the engine 10. The air reaching the engine 10 is therefore cold. The turbine 52 of the turbocharger 50 is located at the end of the discharge duct 12 and is coupled to the compressor 51. The exhaust gas leaves the engine compartment and is then discharged via the line 54.

Furthermore, this assembly includes an EGR circuit 20, the inlet 28 of which is connected to the discharge duct 12 and the outlet 29 of which is connected to the intake circuit 11. This EGR circuit 20 includes an EGR cooler 22 connected upstream by an inlet duct 25 and downstream by an outlet duct 27, enabling the exhaust gas to be cooled before being reinjected into the engine 10.

Optionally provided is a bypass circuit 24, this being connected on one side to a valve 23 located upstream of the cooler 22 and on the other side to the outlet of the cooler 22, so that the valve 23 can let through into the bypass circuit 24 a certain quantity of exhaust gas, depending on its position. Thus, by selecting a position of the valve 23, a desired amount of uncooled gas is let through into the bypass circuit 24, and thereby the exhaust gas temperature at the outlet of the cooler 22 is selected. An EGR valve 21 is also provided at the outlet of the circuit 20 so as to regulate, over time, the amount of cooled exhaust gas delivered to the intake duct 11.

Figure 2:
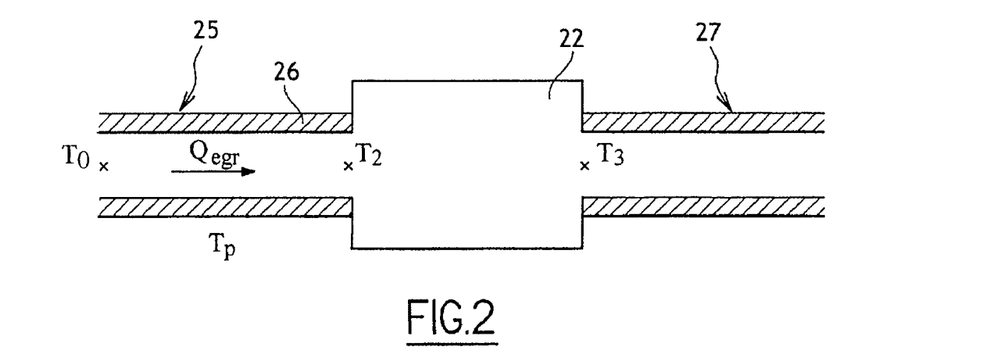
FIG. 2 shows schematically a longitudinal sectional view of an EGR cooler and a portion of its inlet and outlet ducts.

FIG. 2 shows schematically a longitudinal sectional view of an EGR cooler 22 connected upstream by the gas inlet duct 25 and downstream by the gas outlet duct 27. These two ducts 25 and 27 are shown here as being tubes having a wall 26. In this figure, it should also be pointed out that there are temperature differences along the circuit 20. Thus:

$T_0$ is the exhaust gas temperature measured at the inlet 28 of the EGR circuit 20;

$T_2$ is the exhaust gas temperature at the inlet of the cooler 21;

$T_3$ is the exhaust gas temperature at the outlet of the cooler 21; and $T_w$ is the temperature of the wall 26 of the inlet duct 25.

It should also be pointed out that the mass flow rate of exhaust gas in the circuit 20 is denoted by $Q_{egr}$.

The Applicant has taken recordings of the exhaust gas temperature along the EGR circuit 20, showing that about 35% of the energy of the gas at the inlet 28 of the circuit 20 may be lost in the inlet duct 25 and that about 65% is lost in the cooler 22.

The gas temperature at the inlet 28 of the circuit 20 cannot therefore be the same as the gas temperature at the inlet of the cooler 22.

It is therefore necessary in a model to take into account the heat exchange between the gas and the inlet duct 25 upstream of the cooler 22.

1$^{st}$ Embodiment

Development of Physics Equations

To estimate the heat exchange within an EGR circuit 20 correctly, it is necessary to take into account:

the internal heat exchange between the gas and the wall 26 of the inlet duct 25;

the external heat exchange between the wall 26 of the inlet duct 25 and the environment of the engine compartment, two types of heat exchange being predominant in the engine compartment:

convective heat exchange due to the flow of air around the PU (power unit) and radiative heat exchange between the various components under the hood (cylinder head, exhaust manifold, turbocharger, bulkhead, "ski", etc.);

cooling of the gas through the EGR cooler.

Figure 3:
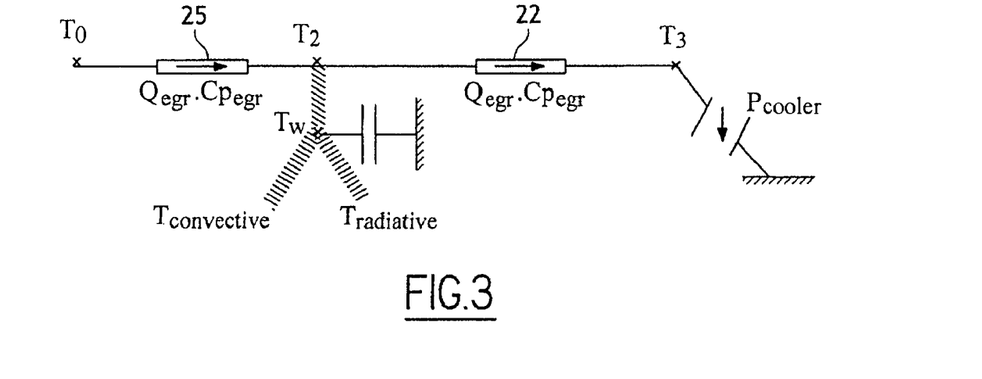
FIG. 3 shows a functional diagram of a thermal arrangement equivalent to the EGR cooler assembly according to FIG. 2, illustrating a first embodiment of the invention.

FIG. 3 shows a "thermal ⇔ electrical" analogy used to establish the energy balance of the EGR circuit 20. This method provides an equivalence between the thermal system of FIG. 2 and the electrical system of FIG. 3.

It should be noted that the entire wall of the EGR tube is assumed here to be at a single overall temperature: $T_w$.

The conservation of energy equations for the EGR system may thus be expressed in the form:

$$M_{st,st} Cp_{st,st} \frac{dT_w}{dt} = G_{convective,internal}(T_2 - T_w) + G_{convective,external}(T_{convective} - T_w) + G_{radiative,external}(T_{radiative} - T_w)$$

$$M_{egr} Cp_{egr} \frac{dT_2}{dt} = G_{convective,internal}(T_2 - T_w) + Q_{egr} Cp_{egr}(T_0 - T_2)$$

$$K_3 Cp_3 \frac{dT_3}{dt} = Q_{egr} Cp_{egr}(T_2 - T_3) - P_{cooler,egr}$$

The meanings of the terms in these equations may be more readily understood by referring to the glossary at the end of the description.

By specifying the conductances ($G_{convective\_internal}$, $G_{radiative\_external}$ and $G_{convective\_external}$), these equations then become:

$$\begin{cases} M_{st,st} Cp_{st,st} \dfrac{dT_w}{dt} = h_{int}S(T_2 - T_w) + \varepsilon\sigma Sf_{ij}(T_{radiative}^4 - T_w^4) + \\ \qquad\qquad h_{ext}S(T_{convective} - T_w) \\ M_{egr} Cp_{egr} \dfrac{dT_2}{dt} = h_{int}S(T_w - T_2) + Q_{egr}Cp_{egr}(T_\theta - T_2) \\ \dfrac{dT_3}{dt} = \dfrac{1}{\tau_3}[T_2(1 - \varepsilon_3) + \varepsilon_3 T_{water} - T_3] \end{cases} \quad (1)(2)(3)$$

Here again, the meanings of the various terms in this system of equations may be more clearly understood by referring to the glossary at the end of the description.

In addition, the meanings and the values of certain terms in this system of differential equations are given below:

$h_{int}$:

The internal convective heat exchange between the EGR gas and the wall 26 of the inlet duct 25 is described macroscopically by a heat exchange coefficient $h_{int}$. This coefficient is obtained using an empirical relationship linking three dimensionless coefficients, namely the Nusselt number (Nu), the Reynolds number (Re) and the Prandtl number (Pr):

$$Nu = 0.021 Re^{0.8} Pr^{0.6} = \frac{h_{int} D_{characteristic}}{\lambda}$$

where:

$\lambda$ is the thermal conductivity of the EGR gas, which is a constant for the exhaust gas in question, Pr is a constant $\approx 0.7$, $$Re = \frac{\rho V D_{characteristic}}{\mu} = \frac{4 Q_{egr}}{\mu \pi D_{characteristic}}$$

(see the glossary at the end of the description for the meaning of the various terms) and $D_{characteristic}$: characteristic diameter. In the case of an EGR duct, this may be taken to be the internal diameter of the duct ($D_{egr}$);

$h_{ext}$:

The convective heat exchange due to the flow of air around the circuit 20 is described macroscopically by a convective heat exchange coefficient $h_{ext}$. This coefficient is considered to be constant and is adjusted so as to reset the model with respect to trials carried out.

The average temperature of the air passing through the engine compartment ($T_{convective}$) generally follows a variation similar to that of the coolant temperature at the outlet of the engine 10. This is because the water temperature at the outlet of the engine compartment is a good indicator of the thermal environment in the engine compartment.

Thus, the following simplification is made:

$T_{convective} = T_{water}$:

σ: Boltzmann's constant (=5.67×10$^{-8}$), enabling the radiative heat exchange between the various components under the hood to be described.

The under-hood radiative heat exchange is of the same order of magnitude as the convective heat exchange, and therefore cannot be neglected. The energy exchange of radiative origin is described by equations in $T^4$.

The form factor ($f_{ij}$), which is defined as "the way in which the inlet duct 25 sees the rest of the under-hood components", is set here to 1.

The inlet duct 25 upstream of the cooler 22 generally has an emissivity (ε) of around 0.8.

The average temperature of the components in the engine compartment ($T_{radiative}$) generally follows a variation close to that of the water temperature at the outlet of the engine. Therefore:

$T_{radiative} = T_{water}$ $\varepsilon_3$:

The thermal power extracted by the cooler 22 is frequently expressed in the form of an efficiency $\varepsilon_3$:

$$\varepsilon 3 = \frac{T_2 - T_3}{T_2 - T_{water}}.$$

This extracted thermal power may be identified on a component test bed. The efficiency of the EGR cooler depends, to the order of 1, on the EGR flow rate ($Q_{egr}$).

Other quantities in equations (1), (2) and (3):

$M_{egr}$ is the mass of gas contained in the inlet duct 25 and is so small compared with the other terms of the equations that it can be considered to be negligible;

$Cp_{egr}$ is the specific heat of the EGR gas at constant pressure. This depends on the nature of the gas and is typically close to 1150 J/kg.K;

$Cp_{st,st}$ is the specific heat of the EGR gas in the walls 26 of the inlet duct 25, the value of which is dependent on the nature of the material (here for example stainless steel); and $Q_{egr}$ is the EGR flow rate of gas passing through the inlet duct 25. This is not measured, but is estimated by calculating the difference between a measurement of $Q_{fresh}$ (the flow rate measured at the outlet of the compressor 51) and a measurement of $Q_{engine}$ (the flow rate of gas entering the engine). Other existing techniques, known to those skilled in the art, may also be used as an alternative for estimating $Q_{egr}$. These chosen techniques are typically specific to each engine computer used and to each software package provided.

There are thus three equations with three unknowns ($T_w$, $T_2$, $T_3$) which can be solved by firstly finding $T_w$, then $T_2$ and finally $T_3$.

An estimation of the temperature at the outlet of the cooler 22 is then obtained by taking into account the heat dissipation in the inlet duct 25, therefore making the estimation precise, as this is faithful to reality.

2$^{nd}$ Embodiment

Drastic Simplification of the Equations

The physics equations developed above can be integrated in a computer but they may remain relatively complicated (equations 1, 2 and 3). This is because they form a system of nonlinear differential equations (owing to the presence of terms in $T^4$) that are strongly coupled.

It would therefore be desirable to simplify this system so as to obtain a system of independent linear first-order differential equations. For this purpose, with reference to FIG. 4, the EGR circuit 20 is considered to be a combination of two heat exchangers 100 and 200 in series.

Figure 4:
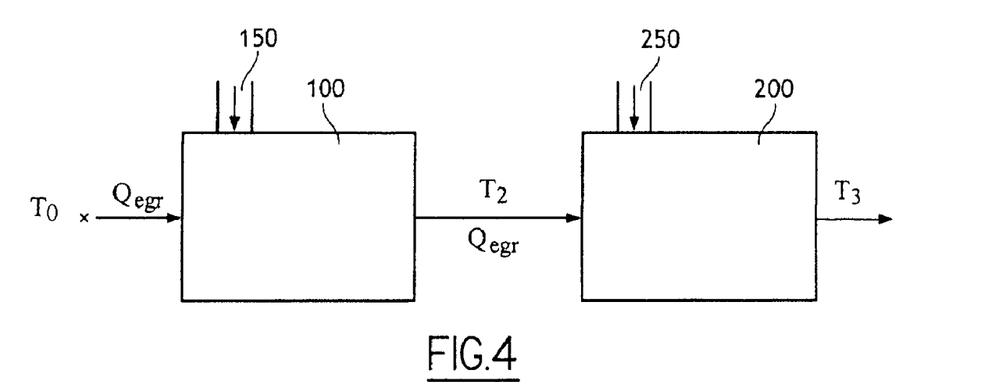
FIG. 4 shows a functional diagram a functional diagram of a thermal arrangement equivalent to the EGR cooler assembly according to FIG. 2, illustrating a second embodiment of the invention.

The first heat exchanger 100 consists of the inlet duct 25 upstream of the cooler 22. The EGR gas cooled by the ambient medium 150 within the engine compartment ($T_{radiative}$ and $T_{convective}$ as explained above) flows through this heat exchanger 100. The gas temperature at the outlet of this first heat exchanger 100 is the temperature $T_2$.

The second heat exchanger 200 consists of the EGR cooler 22. The EGR gas (at the temperature $T_2$) cooled by the water ($T_{water}$) of the engine cooling circuit 250 flows through this heat exchanger 200. The gas temperature at the outlet of this second heat exchanger 200 is the temperature $T_3$.

1. The First Heat Exchanger 100

Defining the inlet duct 25 upstream of the cooler as a heat exchanger 100, the following efficiency is introduced macroscopically:

$$\varepsilon 3 = \frac{T_0 - T_2}{T_0 - T_{under\text{-}hood}}.$$

This efficiency summarizes the thermal performance of the inlet duct 25, i.e. the way in which the EGR gas is cooled upon contact with the wall 26 of the duct 25, which duct itself is cooled by the under-hood environment.

The notion of efficiency is generally used in the steady state.

However, since the mass of the inlet duct 25 is large (several hundred grams), the temperature ($T_w$) of the wall 26 of the duct 25 is not reached until several minutes have elapsed and therefore the notion of efficiency can no longer be used in a simple manner, i.e. without involving differential equations that can be easily integrated in a computer.

It therefore becomes necessary to define intermediate efficiencies involving:
  the temperature ($T_{w\infty}$) of the wall 26 of the inlet duct 25 when the steady state is reached; and
  the temperature ($T_{2\infty}$) of the gas at the cooler inlet when the steady state is reached.

Said efficiency is then decomposed into two parts:

$$\varepsilon = \underbrace{\frac{T_0 - T_{2\infty}}{T_0 - T_{w\infty}}}_{\varepsilon_2} \underbrace{\frac{T_0 - T_{w\infty}}{T_0 - T_{under\text{-}hood}}}_{\varepsilon_1} \quad (4)$$

Approximately:
  $\varepsilon_1$ describes the way in which the exhaust gas heats the walls 26 of the duct 25; and
  $\varepsilon_2$ describes the way in which the exhaust gas is cooled upon contact with the wall 26 of the duct 25.

1.1 Simplification of Equation (1)

The conservation of energy equation (1) can be complicated to solve, in particular because of the term in $T^4$ due to the radiative heat exchange beneath the hood.

In the engine compartment, the convective heat exchange due to the flow of air around the inlet duct 25 is of the same order of magnitude as all the radiative heat exchange between the inlet duct 25 and the various under-hood components (cylinder head, exhaust manifold, turbocharger, bulkhead, "ski", etc.).

The above equation is thus simplified as:

$$M_{st.st} C p_{st.st} \frac{dT_w}{dt} \approx h_{int} S(T_2 - T_w) + 2 \cdot h_{ext} S(T_{convective} - T_w)$$

The water temperature $T_{water}$ at the engine outlet is generally a good indicator of the thermal environment in the engine compartment, thereby enabling a further simplification to be made as:

$$M_{st.st} C p_{st.st} \frac{dT_w}{dt} \approx h_{int} S(T_2 - T_w) + 2 h_{ext} S(T_{water} - T_w) \quad (5)$$

The timescale governing the wall temperature of the inlet duct 25 upstream of the cooler is of the order of one hundred seconds. The timescale governing the temperature of the EGR gas at the cooler outlet 22 is of the order of one second. The changes in $T_2$ over time are therefore virtually instantaneous in comparison with the changes in $T_w$ over time. Thus:

$$M_{egr} C p_{egr} \frac{dT_2}{dt} <<< M_{st.st} C p_{st.st} \frac{dT_w}{dt}$$

The conservation of energy equation (2) can then be simplified as:

$$M_{egr} C p_{egr} \frac{dT_2}{dt} = h_{int} S(T_w - T_2) + Q_{egr} C p_{egr} (T_0 - T_2) \approx 0$$

where:

$$T_2 = \frac{h_{int} S T_2 + Q_{egr} C p_{egr} T_0}{h_{int} S + Q_{egr} C p_{egr}} \quad (6)$$

Incorporating equation (6) into equation (5), the following is obtained:

$$M_{st.st} C p_{st.st} \frac{dT_w}{dt} \approx \frac{h_{int} S T_w + \frac{Q_{egr} C p_{egr} T_0}{h_{int} S + Q_{egr} C p_{egr}}(T_0 - T_w) + 2 h_{ext} S(T_{water} - T_w) \quad (7)$$

A simple equation describing the variation in temperature of the wall 26 is now sought in the form:

$$\frac{dT_w}{dt} = \frac{1}{\tau_w}(T_{w\infty} - T_w) \quad (8)$$

Moreover, from the definition of $\varepsilon_1$ given above in equation (4) and by approximating $T_{under\text{-}hood}$ to $T_{water}$, the term $T_{w\infty}$ may be written in the form:

$$T_{w\infty} = T_0(1-\varepsilon_1) + \varepsilon_1 T_{water}$$

Then, by identification of equations (7) and (8):

$$\varepsilon_1 \approx \frac{2 h_{ext} S}{2 h_{ext} S + \frac{Q_{egr} C p_{egr} h_{int} S}{Q_{egr} C p_{egr} + h_{int} S}} \text{ and}$$

$$\tau_w \approx \frac{M_{st.st} C p_{st.st}}{2 \cdot h_{ext} S + \frac{Q_{egr} C p_{egr} h_{int} S}{Q_{egr} C p_{egr} + h_{int} S}}$$

1.2 Simplification of Equation 2

The timescale governing the temperature of the EGR gas at the cooler inlet is of the order of one second. On this scale, the wall temperature of the EGR duct upstream of the cooler varies little.

Thus, the definition of $\epsilon_2$ given in equation 4 is written as:

$$\varepsilon_2 = \frac{T_0 - T_{2\infty}}{T_0 - T_{w\infty}} \approx \frac{T_0 - T_{2\infty}}{T_0 - T_w}$$

i.e.:

$$T_{2\infty} \approx T_0(1-\epsilon_2) + \epsilon_2 T_w$$

A simple equation describing the variation in temperature of the EGR gas at the cooler inlet is sought in the form:

$$\frac{dT_2}{dt} = \frac{1}{\tau_2}(T_{2\infty} - T_2) \quad (9)$$

By identification of equations 9 and 2:

$$\varepsilon_2 \approx \frac{h_{int}S}{h_{int}S + Q_{egr}Cp_{egr}}$$

$$\tau_2 \approx \frac{M_{egr}Cp_{egr}}{h_{int}S + Q_{egr}Cp_{egr}}$$

1.3 Summary of the Simplification of the First Heat Exchanger 100

The conservation of energy equations governing the heat exchange of the gas in the EGR duct upstream of the cooler were initially expressed as:

$$\begin{cases} M_{st.st}Cp_{st.st}\frac{dT_w}{dt} = h_{int}S(T_2 - T_w) + \varepsilon\sigma Sf_{ij}(T_{radiative}^4 - T^4) + \\ h_{ext}S(T_{convective} - T_w) \\ M_{egr}Cp_{egr}\frac{dT_2}{dt} = h_{int}S(T_w - T_2) + Q_{egr}Cp_{egr}(T_0 - T_2) \end{cases} \quad (1)$$
$$\qquad (2)$$

After simplification, these two equations are now expressed in the form:

$$\begin{cases} T_{w\infty} = T_0(1 - \varepsilon_1) + \varepsilon_1 T_{water} \\ \frac{dT_w}{dt} = \frac{1}{\tau_w}[T_{w\infty} - T_w] \end{cases} \quad \text{Simplified equation (1)}$$

$$\begin{cases} T_{2\infty} = T_0(1 - \varepsilon_2) + \varepsilon_2 T_w \\ \frac{dT_2}{dt} = \frac{1}{\tau_2}[T_{2\infty} - T_2] \end{cases} \quad \text{Simplified equation (2)}$$

where:

$$\varepsilon_1 \approx \frac{2h_{ext}S}{2h_{ext}S + \frac{Q_{egr}Cp_{egr}h_{int}S}{Q_{egr}Cp_{egr} + h_{int}S}}$$

i.e. $\varepsilon_1 \approx \frac{2h_{ext}S}{2h_{ext}S + Q_{egr}Cp_{egr}\cdot\varepsilon_2} \quad \varepsilon_2 \approx \frac{h_{int}S}{h_{int}S + Q_{egr}Cp_{egr}}$ i.e. $\tau_w \approx \frac{M_{st.st}Cp_{st.st}}{2h_{ext}S + Q_{egr}Cp_{egr}\varepsilon_2} \quad \tau_2 \approx \frac{M_{egr}Cp_{egr}}{h_{int}S + Q_{egr}Cp_{egr}}$ $$\tau_w \approx \frac{M_{st.st}Cp_{st.st}}{2h_{ext}\cdot S + \frac{Q_{egr}Cp_{egr}h_{int}S}{Q_{egr}Cp_{egr} + h_{int}S}}$$

To a first order of magnitude, $\epsilon_1$ and $\epsilon_2$ depend only on the EGR flow rate ($Q_{egr}$). This is because:

for $\epsilon_2$:

$h_{int}$, the convective heat exchange coefficient for heat exchange between the EGR gas and the wall of the EGR duct, is a Reynolds function$^{0.8}$. To a first order of magnitude, the Reynolds number is a function of the EGR flow rate ($Q_{egr}$).

$\epsilon_2$ can then be expressed as follows:

$$\varepsilon_2 = \frac{K_2}{K_2 + Cp_{egr}Q_{egr}^{0.2}}$$

where $K_2$=constant.

for $\epsilon_1$:

$\epsilon_1$ is directly related to $\epsilon_2$ through the relationship:

$$\varepsilon_1 \approx \frac{2h_{ext}S}{2h_{ext}S + Q_{egr}Cp_{egr}\varepsilon_2}$$

it being reminded that $h_{ext}$ is the constant convective heat exchange coefficient in question.

$\epsilon_1$ can then be written as follows:

$$\varepsilon_1 = \frac{K_1}{K_1 + Cp_{egr}Q_{egr}\varepsilon_2}$$

where $K_1$=constant.

To a first order of magnitude, the time constants $\tau_w$ and $\tau_2$ again depend only on the EGR flow rate ($Q_{egr}$). However:

for $\tau_2$: the EGR mass within the EGR duct is low. The time constant $\tau_2$ may experience only slight variations, and will therefore be considered as a constant. However, other possible ways of describing this time constant may be considered, such as a description based on a more complex mathematical model or rule managed by a program.

for $\tau_w$: for the sake of simplification, an average EGR flow rate may be taken so as to determine a single time constant. However, other possible ways of describing this time constant may be considered, such as a description based on a more complex mathematical model or rule managed by a program.

After simplification, equations (1) and (2) are expressed as:

$$\begin{cases} T_{w\infty} = T_0(1 - \varepsilon_1) + \varepsilon_1 T_{water} \\ \frac{dT_w}{dt} = \frac{1}{\tau_w}[T_{w\infty} - T_w] \end{cases} \quad \text{Simplified equation (1)}$$

-continued $$\begin{cases} T_{2\infty} = T_0(1 - \varepsilon_2) + \varepsilon_2 T_w \\ \dfrac{dT_2}{dt} = \dfrac{1}{\tau_2}[T_{2\infty} - T_2] \end{cases} \quad \text{Simplified equation (2)}$$

where:

$$\varepsilon_1 = \frac{K_1}{K_1 + Cp_{egr} Q_{egr} \varepsilon_2}$$

$$\varepsilon_2 = \frac{K_2}{K_2 + Cp_{egr} Q_{egr}^{0.2}}$$

$K_1 = $ constant $K_2 = $ constant $\tau_w = $ constant $\tau_2 = $ constant

The constants $K_1$, $K_2$, $\tau_w$ and $\tau_2$ are known (see the above methods of calculation), knowing the orders of magnitude assigned to $M_{st.st}$, $Q_{egr}$, $h_{ext}$ and $h_{int}$ and based on measurements and/or estimates.

These constants may then be adjusted so as to reset the model with respect to trials carried out beforehand on the engine compartment.

2. The Second Heat Exchanger 200

Equation (3) in this case is retained.

The time constant ($\tau_3$) is then introduced into the EGR temperature estimator so as to take into account the thermal inertia of the cooler 22. This constant may be measured on an engine test bed or estimated from data received from a cooler manufacturer.

This constant may be adjusted so as to reset the model with respect to the trials carried out beforehand on an engine compartment.

The estimated temperature $T_3$ at the outlet of the cooler 22 can then be deduced therefrom.

Figure 6:
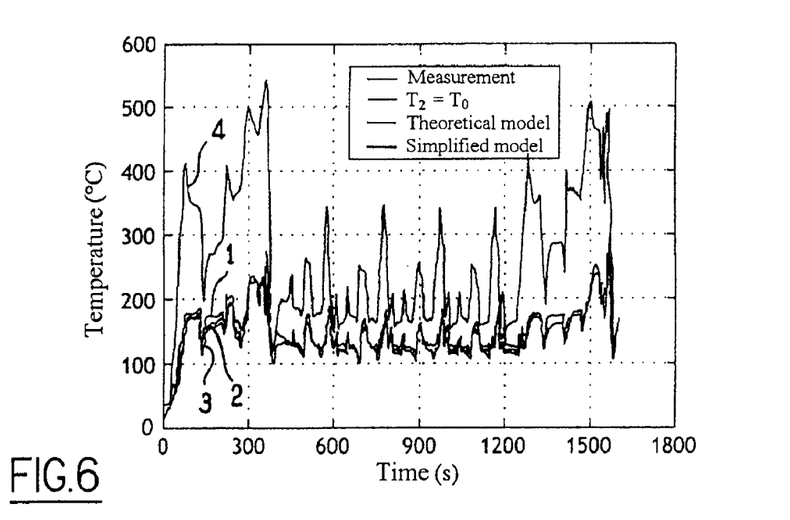
FIG. 6 is a graph giving the variation in the temperature at the outlet of the EGR circuit as a function of the EGR cycles, such that the temperatures are measured or estimated.

FIG. 6 shows various curves of the gas temperature $T_3$ at the outlet of the cooler 22, enabling comparisons to be made between:

a measurement made (curve 1);

an estimation according to the first embodiment of the invention (curve 2); and an estimation according to the second embodiment of the invention (curve 3).

The estimation methods were integrated into an automobile computer.

In addition, curve 4 gives the result of an estimation of $T_3$ in the case in which the heat dissipation by the inlet duct 25 is not taken into account.

It is clear from examining the graph that taking into account in the modeling the heat exchange between the gas and the walls 26 of the inlet duct 25 upstream of the cooler 22 considerably improves the precision in estimating the temperature of the EGR gas at the outlet of the cooler 22.

Thus, the mean deviations between the estimate of the EGR gas temperature at the outlet of the cooler 22 according to the invention and the measurements are from 8 to 12° C.

In addition, it should be noted that this new estimator enables the variations in gas temperature along the EGR circuit to be correctly monitored.

Moreover, the simplification in the second embodiment of the invention results in deviations of only 2% compared with the first embodiment.

The second embodiment will then be used if it is desired to minimize the computing means and the computing time, while the first embodiment will be used if it is desired to maximize the precision of the estimation.

Furthermore, the estimation according to the invention has the advantage of being very simple, and therefore can be easily integrated into a computer.

The proposal to simplify the description of the heat exchange in the EGR circuit 20 is therefore entirely satisfactory.

Figure 5:
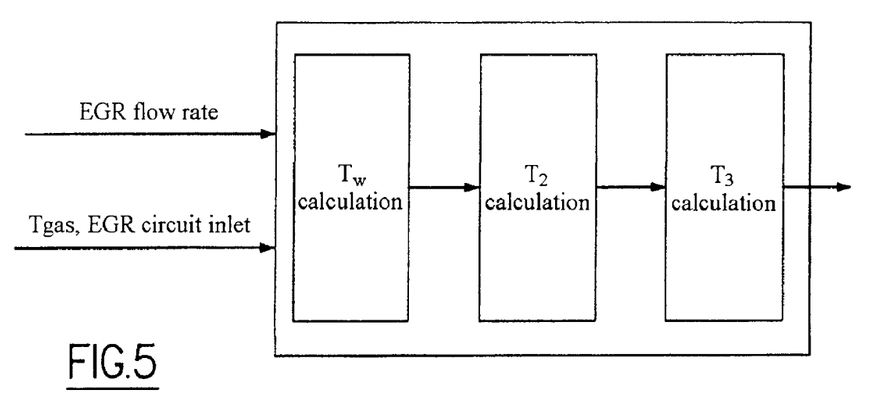
FIG. 5 shows a diagram illustrating the main steps in a method of estimation according to the invention.

FIG. 5 shows that one or other of the simplified formulations is extremely simple for a computer to solve. The exhaust gas temperature at the outlet of the EGR circuit 20 is thus estimated in three successive steps:

firstly, the temperature ($T_w$) of the wall 26 of the inlet duct 25 upstream of the cooler 22 is estimated;

secondly, the temperature ($T_2$) of the EGR gas at the inlet of the cooler 22 is estimated; and lastly, the temperature ($T_3$) of the EGR gas at the outlet of the cooler 22 is estimated.

A number of modeling variants may also be provided, such as the decomposition of the inlet duct 25 upstream of the cooler 22 into several small "sections", each having its own wall temperature $T_w$.

The invention also relates to a vehicle equipped with an electronic temperature estimator that includes computing means or a computer and means for storing predetermined and/or measured data, so as to implement the temperature estimation method according to the invention. In particular, an algorithm may be provided that defines the estimation of the temperature at the outlet of the EGR circuit 20, the execution of which requires few calculation means and few resources, given the simplicity of the method employed. This is therefore an ideal system to be integrated into an onboard computer.

The construction of such a precise EGR temperature estimator opens up a great variety of prospects, such as for example the design of new strategies enabling the level of fouling of the EGR circuit 20 by the exhaust gas to be detected.

| Glossary | | |
|---|---|---|
| Symbol | Definition | Unit |
| $Cp_{egr}$ | Specific heat of the EGR gas at constant pressure | J/kg · K |
| $Cp_{st.st}$ | Specific heat of the EGR duct upstream of the cooler | J/kg · K |
| $Cp_3$ | Specific heat of the EGR duct in the cooler | J/kg · K |
| $\dfrac{d}{dt}$ | Derivative with respect to time | 1/s |
| $D_{characteristic}$ | Characteristic diameter for calculating the Reynolds number | m |
| $D_{egr}$ | Internal diameter of the EGR duct | m |
| $f_{ij}$ | Form factor for the radiative heat exchange | — |
| G | Equivalent electrical conductance | W/K |
| $h_{ext}$ | Convective heat exchange coefficient for heat exchange between the wall of the duct and the airflow under the hood | W/K · m$^2$ |
| $h_{int}$ | Convective heat exchange coefficient for heat exchange between the EGR gas upstream of the cooler and the wall | W/K · m$^2$ |
| $K_{pulse}$ | Internal convective heat exchange correction coefficient due to the pressure pulses in the EGR circuit | — |

-continued

Glossary

| Symbol | Definition | Unit |
|---|---|---|
| $M_{egr}$ | Mass of the EGR gas upstream of the cooler | kg |
| $M_{st\cdot st}$ | Mass of the EGR duct upstream of the cooler | kg |
| Nu | Nusselt number | — |
| Pr | Prandtl number ≈ 0.7 (for the gas) | — |
| $P_{cooler}$ | Thermal power extracted by the EGR cooler | W |
| $Q_{egr}$ | EGR mass flow rate | kg/s |
| Re | Reynolds number | — |
| S | Heat exchange area of the EGR duct upstream of the cooler | $m^2$ |
| $T_0$ | Exhaust gas temperature before the turbine or at the inlet of the EGR circuit | K |
| $T_{convective}$ | Average temperature of the engine under-hood air, corresponding to a heat loss at the walls 26 of the inlet duct 25 by convection | K |
| $T_{water}$ | Water temperature at the engine outlet | K |
| $T_w$ | Average temperature of the wall of the EGR duct upstream of the cooler | K |
| $T_{w\infty}$ | Instantaneous wall temperature (with zero wall thermal inertia) | K |
| $T_{radiative}$ | Average temperature of all the under-hood components corresponding to a heat loss in the walls 26 of the inlet duct 25 by radiation from the surrounding engine components | K |
| $T_2$ | Temperature of the EGR gas at the cooler inlet | K |
| $T_{2\infty}$ | Instantaneous gas temperature at the wall cooler inlet (with zero thermal inertia) | K |
| $T_3$ | Temperature of the EGR gas at the cooler outlet | K |
| $T_{3\infty}$ | Instantaneous gas temperature at the wall cooler outlet (with zero thermal inertia) | K |
| V | Velocity of the EGR gas in the EGR duct upstream of the cooler | m/s |
| λ | Thermal conductivity of the EGR gas | W/m·K |
| ε | Emissivity of the EGR duct at the cooler inlet | — |
| $\epsilon_1$ | External efficiency of the EGR duct upstream of the cooler after simplifying the differential equations | — |
| $\epsilon_2$ | Internal efficiency of the EGR duct upstream of the cooler after simplification of the differential equations | — |
| $\epsilon_3$ | Efficiency of the EGR cooler | — |
| ρ | Density of the EGR gas | kg/$m^3$ |
| $\tau_w$ | Time constant of the EGR duct upstream of the cooler | s |
| $\tau_2$ | Time constant of the EGR gas at the inlet of the cooler | s |
| $\tau_3$ | Time constant of the EGR cooler | s |
| μ | Kinematic viscosity of the EGR gas | kg·m·s |
| π | Pi (∞ 3.1416) | — |

The invention claimed is:

1. A method of estimating an exhaust gas temperature $T_3$ in an internal combustion engine of a vehicle at an outlet of an EGR circuit with which the engine is equipped, the vehicle including an electronic temperature estimating computer, the method comprising:
    measuring an EGR circuit inlet temperature $T_0$;
    calculating, using the electronic temperature estimating computer, a temperature $T_W$ of a wall of an EGR duct conveying exhaust gas in the EGR circuit;
    calculating, using the electronic temperature estimating computer, a temperature $T_2$ of the exhaust gas at an inlet of an EGR cooler of the EGR circuit;
    estimating, using the electronic temperature estimating computer, the exhaust gas temperature $T_3$ at the outlet of the EGR circuit based on the EGR circuit inlet temperature $T_0$, the temperature $T_2$ of the exhaust gas at the inlet of the EGR cooler, and a thermal energy loss of the exhaust gas in the EGR cooler of the EGR circuit, wherein the temperature $T_W$ of the wall is calculated according to the following:

$$\begin{cases} T_{w\infty} = T_0(1-\varepsilon_1) + \varepsilon_1 T_{water} \\ \dfrac{dT_w}{dt} = \dfrac{1}{\tau_w}[T_{w\infty} - T_w] \end{cases}$$

where:

$$\varepsilon_1 = \frac{K_1}{K_1 + Cp_{egr}Q_{egr}\varepsilon_2};$$

$K_1$=constant;
$\tau_w$=Time constant of the EGR duct upstream of the EGR cooler;
$T_{w\infty}$=Instantaneous wall temperature (with zero wall thermal inertia);
$\epsilon_1$=external efficiency of the EGR duct upstream of the EGR cooler upon simplifying predetermined differential equations; and
$\epsilon_2$=Internal efficiency of the EGR duct upstream of the EGR cooler upon simplifying the predetermined differential equations.

2. The method as claimed in claim 1, wherein the estimating the temperature $T_3$ includes determining a temperature of engine coolant leaving the engine, a specific heat of the exhaust gas at constant pressure, a mass flow rate of the exhaust gas, a specific heat of said EGR duct and geometric and mass characteristics of the EGR duct.

3. The method as claimed in claim 1, wherein the temperature $T_2$ of the exhaust gas at the inlet of the EGR cooler is calculated according to the following:

$$\begin{cases} T_{2\infty} = T_0(1-\varepsilon_2) + \varepsilon_2 T_w \\ \dfrac{dT_2}{dt} = \dfrac{1}{\tau_2}[T_{2\infty} - T_2] \end{cases}$$

where:

$$\varepsilon_2 = \frac{K_2}{K_2 + Cp_{egr}Q_{egr}^{0.2}}$$

$K_2$ = constant $\tau_2$ = constant and where:
$T_{2\infty}$=Instantaneous gas temperature at an inlet wall of the EGR cooler (with zero thermal inertia)
$\tau_2$=Time constant of the exhaust gas at the inlet of the cooler.

4. A method of estimating an exhaust gas temperature $T_3$ in an internal combustion engine of a vehicle at an outlet of an EGR circuit with which the engine is equipped, the vehicle including an electronic temperature estimating computer, the method comprising:
    estimating, using the electronic temperature estimating computer, a thermal energy loss of exhaust gas in an EGR cooler of the EGR circuit;
    estimating, using the electronic temperature estimating computer, an internal heat exchange between the exhaust gas and a wall of an EGR duct conveying the exhaust gas to the EGR cooler; and estimating, using the electronic temperature estimating computer, an external heat exchange between the wall of the EGR duct and an environment of an engine compartment;

wherein the estimating the thermal energy loss, the estimating the internal heat exchange, and the estimating the external heat exchange are done according to the following:

$$\begin{cases} M_{st.st} Cp_{st.st} \dfrac{dT_w}{dt} = h_{int} S(T_2 - T_w) + \\ \quad \varepsilon \sigma S f_{ij}(T^4_{radiative} - T^4_w) + h_{ext} S(T_{convective} - T_w) \\ M_{egr} Cp_{egr} \dfrac{dT_2}{dt} = h_{int} S(T_w - T_2) + Q_{egr} Cp_{egr}(T_0 - T_2) \\ \dfrac{dT_3}{dt} = \dfrac{1}{\tau_3}[T_2(1 - \varepsilon_3) + \varepsilon_3 T_{water} - T_3] \end{cases}$$

where:
$Cp_{egr}$=Specific heat of the exhaust gas at constant pressure
$Cp_{st.st}$=Specific heat of the EGR duct upstream of the EGR cooler $\dfrac{d}{dt}$ = Derivative with respect to time $f_{ij}$=Form factor for radiative heat exchange
$h_{ext}$=Convective heat exchange coefficient for exchange between the wall of the EGR duct and airflow under a hood of the vehicle
$h_{int}$=Convective heat exchange coefficient for exchange between the exhaust gas upstream of the EGR cooler and the wall
$M_{st.st}$=Mass of said EGR duct
$M_{egr}$=Mass of the exhaust gas upstream of the EGR cooler
$Q_{egr}$=EGR mass flow rate
S=Heat exchange area of the EGR duct upstream of the EGR cooler
$T_0$=Exhaust gas temperature before a turbine or at an inlet of the EGR circuit
$T_{convective}$=Average temperature of air under the hood of the vehicle
$T_{water}$=Water temperature at an outlet of the engine
$T_{radiative}$=Average temperature of all components under the hood of the vehicle
$\epsilon$=Emissivity of said EGR duct at an inlet of the EGR cooler
$\epsilon_3$=Efficiency of the EGR cooler
$\tau_3$=Time constant of the EGR cooler
and in which:
$T_{convective} \approx T_{radiative} \approx T_{water}$
$h_{int}$ is calculated using an empirical relationship linking three dimensionless coefficients, namely a Nusselt number, a Reynolds number and a Prandtl number: Nu=f($Re^{0.8}$, Pr);
$h_{ext}$ is considered to be constant and adjusted so as to reset the method of estimating in respect to trials;
$f_{ij}$=1;
$\epsilon$ is around 0.8 or another known constant; and $$\varepsilon_3 = \dfrac{T_2 - T_3}{T_2 - T_{water}}.$$

5. The method as claimed in claim 4, wherein the estimating the thermal energy loss, the estimating the internal heat exchange, and the estimating the external heat exchange include making the following approximations:
an external convective heat exchange linked to air flowing around the EGR duct is of the same order of magnitude as the radiative heat exchange by components external to the EGR duct;
a convection temperature is approximately equal to the water temperature at the outlet of the engine; and
changes in a temperature $T_2$ of the exhaust gas at the inlet of the EGR cooler over time are instantaneous compared with changes in temperature $T_W$ of the wall of the EGR duct over time.

6. A non-transitory computer-readable storage medium, having stored thereon a program that when executed by an electronic temperature estimating computer, causes the electronic temperature estimating computer to perform a method comprising:
measuring an EGR circuit inlet temperature $T_0$;
calculating, using the electronic temperature estimating computer, a temperature $T_W$ of a wall of an EGR duct conveying exhaust gas to an EGR circuit;
calculating, using the electronic temperature estimating computer, a temperature $T_2$ of the exhaust gas at an inlet of an EGR cooler of the EGR circuit;
estimating, using the electronic temperature estimating computer, an exhaust gas temperature $T_3$ at an outlet of an EGR circuit based on the EGR circuit inlet temperature $T_0$, the temperature $T_2$ of the exhaust gas at the inlet of the EGR cooler, and a thermal energy loss of the exhaust gas in the EGR cooler of the EGR circuit,
wherein the temperature $T_W$ of the wall is calculated according to the following:

$$\begin{cases} T_{w\infty} = T_0(1 - \varepsilon_1) + \varepsilon_1 T_{water} \\ \dfrac{dT_w}{dt} = \dfrac{1}{\tau_w}[T_{w\infty} - T_w] \end{cases}$$

where:

$$\varepsilon_1 = \dfrac{K_1}{K_1 + Cp_{egr} Q_{egr} \varepsilon_2};$$

$K_1$=constant;
$\tau_w$=Time constant of the EGR duct upstream of the EGR cooler;
$T_{w\infty}$=Instantaneous wall temperature (with zero wall thermal inertia);
$\epsilon_2$=external efficiency of the EGR duct upstream of the EGR cooler upon simplifying predetermined differential equations; and
$\epsilon_2$=Internal efficiency of the EGR duct upstream of the EGR cooler upon simplifying the predetermined differential equations.

* * * * *